(12) United States Patent
Watkins et al.

(10) Patent No.: US 7,001,938 B2
(45) Date of Patent: Feb. 21, 2006

(54) EPOXY RESIN CURING COMPOSITIONS AND RESIN COMPOSITIONS INCLUDING SAME

(75) Inventors: Michael J. Watkins, Katy, TX (US); Robert J. Pawlik, Dickinson, TX (US)

(73) Assignee: Resolution Performance Products LLC, Houston, TX (US)

( * ) Notice: Subject to any disclaimer, the term of this patent is extended or adjusted under 35 U.S.C. 154(b) by 74 days.

(21) Appl. No.: 10/351,903

(22) Filed: Jan. 27, 2003

(65) Prior Publication Data

US 2004/0147690 A1 Jul. 29, 2004

(51) Int. Cl.
*C08L 63/00* (2006.01)
*C08K 5/16* (2006.01)
*C08G 59/60* (2006.01)
*C08G 59/62* (2006.01)
*C08G 59/64* (2006.01)

(52) U.S. Cl. .......................... 523/461; 525/523; 525/534; 528/93; 528/111; 528/408

(58) Field of Classification Search ................ 525/486, 525/533, 523, 534; 528/93, 94, 111, 408, 528/87, 88, 99; 523/440, 461
See application file for complete search history.

(56) References Cited

U.S. PATENT DOCUMENTS

| | | | | |
|---|---|---|---|---|
| 3,607,833 A | * | 9/1971 | De Hoff et al. | 528/103 |
| 3,666,702 A | * | 5/1972 | Haugh | 523/402 |
| 4,330,664 A | | 5/1982 | Brunelle | |
| 4,331,574 A | * | 5/1982 | Bekooij et al. | 525/530 |
| 4,678,712 A | | 7/1987 | Elliott | |
| 5,212,261 A | * | 5/1993 | Stierman | 525/506 |
| 6,258,919 B1 | * | 7/2001 | Vogel et al. | 528/111 |
| 2003/0065109 A1 | * | 4/2003 | Akatsuka et al. | 525/523 |

* cited by examiner

*Primary Examiner*—Michael J. Feely
(74) *Attorney, Agent, or Firm*—Lisa Kimes Jones

(57) ABSTRACT

Epoxy resin composition curing agents, which include a primary amino alcohol, are disclosed. Specifically, the invention relates to curing agents which include a primary amino alcohol physically blended therewith. Alternatively, the invention relates to curing agents which include a primary amino alcohol reacted into a resinous phenolic compound. Resin systems utilizing the curing agents of the invention exhibit enhanced hot wet adhesion to metal substrates and are particularly useful in the manufacture of powder coatings for pipe.

20 Claims, No Drawings

EPOXY RESIN CURING COMPOSITIONS AND RESIN COMPOSITIONS INCLUDING SAME

FIELD OF THE INVENTION

The present invention relates to epoxy resin compositions, to methods of preparing these epoxy resin compositions and to articles made therefrom. Specifically, the invention relates to curing agents which include a primary amino alcohol physically blended, without the formation of a reaction product, therewith. Alternatively, the invention relates to curing agents which include a primary amino alcohol reacted into a resinous phenolic compound. Resin systems utilizing the curing agents of the invention exhibit enhanced hot wet adhesion to metal substrates and are particularly useful in the manufacture of powder coatings for pipe.

BACKGROUND OF THE INVENTION

Epoxy resin powder coating compositions are utilized in a wide variety of functional and decorative applications which include, for example, corrosion resistant coatings for underground pipe, and steel reinforcing bars, electrical insulating coatings, appliance coatings, and finishes for automotive parts. These powder coatings offer good adhesion, hardness and impact resistance as well as protection from a wide variety of chemical and corrosive environments. In particular, epoxy powder coatings are used extensively for coating pipe used to convey oil and gas. This usage can involve exposure to elevated temperatures and wet conditions. However, conventional epoxy coatings can show significant loss of adhesion when utilized under such hot, wet conditions.

U.S. Pat. No. 4,330,644 discloses a curable composition comprising (1) a solid epoxy composition prepared by reacting (a) a solid epoxy resin prepared by reacting a normally liquid epoxy resin with a polyhydric phenol in the presence of an etherification catalyst with (b) a small amount of tris(hyroxymethyl)aminomethane and (2) at least one epoxy curing agent. The resulting tris-aminomethane modified solid epoxy fusion resin may be cured with conventional epoxy curing agents.

U.S. Pat. No. 4,678,712 discloses a curable coating composition prepared from (1) a component having more than one epoxide group (an epoxy resin) and (2) a component having more than one group reactive with the epoxy groups of components (1) (i.e., a polyhydric phenol). Either component (1) or (2) is the reaction product of a compound containing at least one primary or secondary amino group and at least one aliphatic hydroxyl group (i.e. monoamines having one or two alkanol substituted groups) and with an epoxy resin and optionally a component reactive therewith where the reaction product contains terminal aliphatic hydroxyl groups and epoxy groups or groups reactive with epoxy groups. The components (1) and (2) are preferably normally solid materials and the coating composition is a powder coating composition.

In light of the above, there is a need in the art for epoxy resin systems having a improved hot wet adhesion for coating pipe especially for pipe used to convey oil and gas.

SUMMARY OF THE INVENTION

The epoxy resin curing compositions of the invention include a primary amino alcohol, preferably represented by the formula:

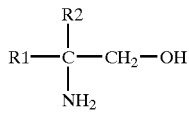

wherein each of R1 and R2 is independently selected from the group consisting of hydrogen, a hydroxy group, a hydroxyalkyl group, an alkyl group, an aryl group, a cycloalkyl group, an alkoxy group, a cycloalkoxy group, an acyl group, and an acyloxy group.

In one embodiment, the primary amino alcohol is physically blended, without the formation of a reaction product, with a curing agent. In another embodiment, the primary amino alcohol is reacted into a resinous phenolic compound.

In another embodiment, the invention includes epoxy resin compositions including the curing agent of the invention.

DETAILED DESCRIPTION OF THE INVENTION

The epoxy resin curing compositions of the present invention include at least one curing agent and at least one primary amino alcohol. Epoxy resin compositions of the invention include the curing composition of the invention and at least one epoxy resin component.

A. Epoxy Resin Component

The epoxy resin compositions of the invention include at least one epoxy resin component. Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric.

The epoxy resin compound utilized may be, for example, an epoxy resin or a combination of epoxy resins prepared from an epihalohydrin and a phenol or a phenol type compound, prepared from an epihalohydrin and an amine, prepared from an epihalohydrin and an a carboxylic acid, or prepared from the oxidation of unsaturated compounds.

In one embodiment, the epoxy resins utilized in the compositions of the present invention include those resins produced from an epihalohydrin and a phenol or a phenol type compound. The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (i.e. the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

In another embodiment, the epoxy resin utilized in the compositions of the invention preferably include those resins produced from an epihalohydrin and bisphenols, halogenated bisphenols, hydrogenated bisphenols, novolac resins, and polyalkylene glycols, or combinations thereof.

In another embodiment, the epoxy resin compounds utilized in the compositions of the invention preferably include those resins produced from an epihalohydrin and resorcinol, catechol, hydroquinone, biphenol, bisphenol A, bisphenol AP (1,1-bis(4-hydroxyphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, or combinations thereof.

The preparation of such compounds is well known in the art. See Kirk-Othmer, Encyclopedia of Chemical Technology, 3rd Ed., Vol. 9, pp 267–289. Examples of epoxy resins and their precursors suitable for use in the compositions of the invention are also described, for example, in U.S. Pat. Nos. 5,137,990 and 6,451,898 which are incorporated herein by reference.

In another embodiment, the epoxy resins utilized in the compositions of the present invention include those resins produced from an epihalohydrin and an amine. Suitable amines include diaminodiphenylmethane, aminophenol, xylene diamine, anilines, and the like, or combinations thereof.

In another embodiment, the epoxy resin utilized in the compositions of the present invention include those resins produced from an epihalohydrin and a carboxylic acid. Suitable carboxylic acids include phthalic acid, isophthalic acid, terephthalic acid, tetrahydro- and/or hexahydrophthalic acid, endomethylenetetrahydrophthalic acid, isophthalic acid, methylhexahydrophthalic acid, and the like or combinations thereof.

In another embodiment, the epoxy resin compounds utilized in the compositions of the invention include those resins produced from an epihalohydrin and compounds having at least one aliphatic hydroxyl group. In this embodiment, it is understood that such resin compositions produced contain an average of more than one aliphatic hydroxyl groups. Examples of compounds having at least one aliphatic hydroxyl group per molecule include aliphatic alcohols, aliphatic diols, polyether diols, polyether triols, polyether tetrols, any combination thereof and the like. Also suitable are the alkylene oxide adducts of compounds containing at least one aromatic hydroxyl group. In this embodiment, it is understood that such resin compositions produced contain an average of more than one aromatic hydroxyl groups. Examples of oxide adducts of compounds containing at least one aromatic hydroxyl group per molecule include ethylene oxide, propylene oxide, or butylene oxide adducts of dihydroxy phenols, biphenols, bisphenols, halogenated bisphenols, alkylated bisphenols, trisphenols, phenol-aldehyde novolac resins, halogenated phenol-aldehyde novolac resins, alkylated phenol-aldehyde novolac resins, hydrocarbon-phenol resins, hydrocarbon-halogenated phenol resins, or hydrocarbon-alkylated phenol resins, or combinations thereof.

In another embodiment the epoxy resin refers to an advanced epoxy resin which is the reaction product of one or more epoxy resins components, as described above, with one or more phenol type compounds and/or one or more compounds having an average of more than one aliphatic hydroxyl group per molecule as described above. Alternatively, the epoxy resin may be reacted with a carboxyl substituted hydrocarbon. A carboxyl substituted hydrocarbon is described herein as a compound having a hydrocarbon backbone, preferably a $C_1$–$C_{40}$ hydrocarbon backbone, and one or more carboxyl moieties, preferably more than one, and most preferably two. The $C_1$–$C_{40}$ hydrocarbon backbone may be a straight- or branched-chain alkane or alkene, optionally containing oxygen. Fatty acids and fatty acid dimers are among the useful carboxylic acid substituted hydrocarbons. Included in the fatty acids are caproic acid, caprylic acid, capric acid, octanoic acid, VERSATIC™ acids, available from Resolution Performance Products LLC, Houston, Tex., decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

In another embodiment, the epoxy resin is the reaction product of a polyepoxide and a compound containing more than one isocyanate moiety or a polyisocyanate. Preferably the epoxy resin produced in such a reaction is an epoxy-terminated polyoxazolidone.

B. Curing Agents

In one embodiment, the curing agent of the invention includes a primary amino alcohol utilized in combination with an amine- and/or amide-containing curing agents. Preferably, the primary amino alcohol is physically blended with the amine- and/or amide-containing curing agents and does not form a reaction product therewith.

Suitable primary amino alcohols include those compounds described by Formula I.

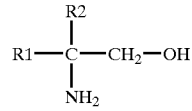

Formula I

In Formula I, each of R1 and R2 is independently hydrogen, a hydroxy group, a hydroxyalkyl group, a hydrocarbyl group such as for example an alkyl, aryl, cycloalkyl, alkoxy, cycloalkoxy, acyl, or acyloxy group, preferably containing 1 to 20 carbon atoms. Preferably, each of R1 and R2 is an alkyl group, a hydroxyalkyl group, or an alkoxy group containing 1 to 20 carbon atoms, preferably 1 to 12 carbon atoms, and more preferably 6 or fewer carbon atoms.

In another embodiment, in addition to the above, each of R1 and R2 in Formula I may also independently be represented by R'O—, R'OO—, HO—CH$_2$—, R'S—, R'$_2$N—, R'$_2$P—, and R'$_3$Si— where each R' is hydrogen or a hydrocarbyl group, as described above, preferably containing 1 to 20 carbon atoms and more preferably containing 1 to 6 carbon atoms.

Examples of commercially available primary amino alcohols for suitable for utilizing in the curing agents of the invention include 2-amino-1-butanol, 2-amino-2-methyl-1,3-propanediol, 2-amino-2-methyl-1-propanol, 2-amino-2-ethyl-1,3-propanediol, 2-amino-3-methyl-1-butanol, 2-amino-1-hexanol, and tris(hydroxymethyl)aminomethane, with tris(hydroxymethyl)aminomethane being most preferred.

Suitable amine- and/or amide-curing agents include those compounds that contain a primary amine moiety, and compounds that contain two or more primary or secondary amine or amide moieties linked to a common central organic moiety. Examples of suitable amine-containing curing agents include ethylene diamine, diethylene triamine, polyoxypropylene diamine, triethylene tetramine, dicyandiamide, melamine, cyclohexylamine, benzylamine, diethylaniline, methylenedianiline, m-phenylenediamine, diaminodiphenylsulfone, 2,4 bis(p-aminobenzyl)aniline, piperidine, N,N-diethyl-1,3-propane diamine, and the like, and soluble adducts of amines and polyepoxides and their salts, such as described in U.S. Pat. Nos. 2,651,589 and 2,640,037.

In another embodiment, the curing agent of the invention includes a primary amino alcohol utilized in combination with a polyamidoamine. Polyamidoamines are typically the reaction product of a polyacid and an amine. Examples of polyacids used in making these polyamidoamines include 1,10-decanedioic acid, 1,12-dodecanedioic acid, 1,20-eicosanedioic acid, 1,14-tetradecanedioic acid, 1,18-octadecanedioic acid and dimerized and trimerized fatty acids. Amines used in making the polyamidoamines include aliphatic and cycloaliphatic polyamines such as ethylene diamine, diethylene triamine, triethylene tetramine, tetraethylene pentamine, 1,4-diaminobutane, 1,3-diaminobutane, hexamethylene diamine, 3-(N-isopropylamino)propylamine and the like. In another embodiment, polyamides are those derived from the aliphatic polyamines containing no more than 12 carbon atoms and polymeric fatty acids obtained by dimerizing and/or trimerizing ethylenically unsaturated fatty acids containing up to 25 carbon atoms.

In another embodiment, the curing agent of the invention includes a primary amino alcohol, as described above utilized in combination with aliphatic polyamines, polyglycoldiamines, polyoxypropylene diamines, polyoxypropylenetriamines, amidoamines, imidazolines, reactive polyamides, ketimines, araliphatic polyamines (i.e. xylylenediamine), cycloaliphatic amines (i.e. isophoronediamine or diaminocyclohexane), menthane diamine, 4,4-diamino-3,3-dimethyldicyclohexylmethane, heterocyclic amines (aminoethyl piperazine), aromatic polyamines (methylene dianiline), diamino diphenyl sulfone, mannich base, phenalkamine, N,N'N"-tris(6-aminohexyl) melamine, and the like. In another embodiment, imidazoles, which may be utilized as an accelerator, may also be utilized in the curing agent of the invention. Preferred imidazoles include 2-methylimidazole, 2-phenylimidazole and 2-ethyl-4-methylimidazole.

In a preferred embodiment for powder coating compositions wherein a latent curing agent is desirable, the curing agent of the invention includes a primary amino alcohol, as described above, utilized in combination with an aromatic amine, a melamine or a substituted melamine, for example bezoquanamine, imidazoles and substituted imidazoles such as 2-methyl imidazole. In a most preferred embodiment for powder coating compositions, the curing agent of the invention includes dicyandiamide.

In one embodiment, The curing agent of the invention includes a primary amino alcohol physically blended with a suitable phenolic compound and/or a resinous phenolic compound described below.

Phenolic compounds may be used as latent curing agents for powder coatings. Suitable phenolic compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, phenol-aldehyde novolac resins, halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof. Preferably, the phenolic curing agent includes substituted or unsubstituted phenols, biphenols, bisphenols, novolacs or combinations thereof.

Certain resinous phenolic compounds are also suitable latent curing agents for powder coatings. These resinous phenolic compounds are represented by the reaction products of epoxy resins with epoxy functionality greater than 1 and phenolic compounds with phenolic hydroxyl functionality greater than 1. The phenolic compound is used in stoichiometric excess so that the resulting reaction product has excess phenolic hydroxyl functionality and very low residual epoxy functionality. Appropriate phenolic compounds are noted above. A commonly used form of these resinous phenolic compounds is represented by the reaction product of 2,2-bis(4-hydroxyphenyl) propane with bisphenol A to produce a resin with a phenolic hydroxyl equivalent weight in the range of 200–1000.

In another embodiment, the curing agent of the invention includes a primary amino alcohol reacted into a resinous phenolic compound described above. Methods known in the art are used to react both the primary amino alcohol and phenolic compound with a suitable epoxy resin.

The ratio of curing agent to epoxy resin is preferably suitable to provide a fully cured resin. The amount of curing agent which may be present may vary depending upon the particular curing agent used (due to the cure chemistry and curing agent equivalent weight as is known in the art). In one embodiment the primary amino alcohol is blended with the amine- and/or amide-containing curing agents in a range of 1 to 50% by weight and preferably 5 to 30% by weight. In another embodiment, the primary amino alcohol is blended with a linear phenolic curing agent in a range of 0.1 to 25% by weight, preferably 1 to 10% by weight, and more preferably 2-6% by weight.

C. Accelerators/Catalysts

Accelerators, also referred to herein as catalysts, may optional be utilized in the resin compositions which include the curing agent of the invention. Accelerators include those compounds which catalyze the reaction of the epoxy resin with the curing agent.

In one embodiment, the accelerators are compounds containing amine, phosphine, heterocyclic nitrogen, ammonium, phosphonium, arsonium or sulfonium moieties. More preferably, the accelerators are heterocyclic nitrogen and amine-containing compounds and even more preferably, the accelerators are heterocyclic nitrogen-containing compounds.

In another embodiment, the heterocyclic nitrogen-containing compounds useful as accelerators include heterocyclic secondary and tertiary amines or nitrogen-containing compounds such as, for example, imidazoles, imidazolidines, imidazolines, bicyclic amidines, oxazoles, thiazoles, pyridines, pyrazines, morpholines, pyridazines, pyrimidines, pyrrolidines, pyrazoles, quinoxalines, quinazolines, phthalazines, quinolines, purines, indazoles, indazolines, phenazines, phenarsazines, phenothiazines, pyrrolines, indolines, piperidines, piperazines, as well as quaternary ammonium, phosphonium, arsonium or stibonium, tertiary sulfonium, secondary iodonium, and other related "onium" salts or bases, tertiary phosphines, amine oxides, and combinations thereof. Imidazoles as utilized herein include imidazole, 1-methylimidazole, 2-methylimidazole, 4-methylimidazole, 2-ethylimidazole, 2-ethyl-4-methylimidazole, 2-phenylimidazole, 2-undecylimidazole, 1-benzyl-2-methylimidazole, 2-heptadecyl imidazole, 4,5-diphenylimidazole, 2-isopropylimidazole, 2,4-dimethyl imidazole, 2-phenyl-4-methylimidazole, 1-cyanoethyl-2-ethyl-4-methylimidazole and the like. Preferred imidazoles include 2-methylimidazole, 2-phenylimidazole and 2-ethyl-4-methylimidazole.

Among preferred tertiary amines that may be used as accelerators are those mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanolamine, triethylamine, tributylamine, benzyl-dimethylamine, tricyclohexyl amine, pyridine, quinoline, and the like. Preferred amines are the trialkyl and tricycloalkyl amines, such as triethylamine, tri(2,3-dimethylcyclohexyl)amine, and the alkyl dialkanol amines, such as methyl diethanolamine and the trialkanolamines such as triethanolamine. Weak tertiary amines, e.g., amines that in aqueous solutions give a pH less than 10, are particularly preferred. Especially preferred tertiary amine accelerators are benzyldimethylamine and tris-(dimethylaminomethyl) phenol.

Imidazolines as utilized herein include 2-methyl-2-imidazoline, 2-phenyl-2-imidazoline, 2-undecylimidazoline, 2-heptadecylimidazoline, 2-isopropylimidazole, 2,4-dimethyl imidazoline, 2-phenyl-4-methylimidazoline, 2-ethylimidazoline, 2-isopropylimidazoline, 4,4-dimethyl-2-imidazoline, 2-benzyl-2-imidazoline, 2-phenyl-4-methylimidazoline and the like.

The curing agents of the invention may be utilized in curable coating compositions which may optionally include adjuncts known in the art such as pigments, fillers, dyes and flow control agents. In addition, epoxy resin powder coatings including the curing agent of the invention may be applied by application methods known in the art. Examples of application methods include electrostatic spray application, fluidized bed and electrostatic fluidized bed.

In order to provide a better understanding of the present invention including representative advantages thereof, the following examples are offered. It is understood that the examples are for illustrative purposes and should not be regarded as limiting the scope of the invention to any specific materials or conditions.

EXAMPLES

Epoxy Resin A is a commercial grade of 2,2-bis(4-hydroxyphenyl) propane having an epoxy equivalent weight of about 187. Epoxy Resin B is a commercial grade of 2,2-bis(4-hydroxyphenyl) propane having an epoxy equivalent weight of about 900, and which contains about 0.5% of an acrylic flow control additive. Catalyst C is the reaction product of Epoxy Resin A and 2-methyl imidazole with a residual alkalinity of approximately 3.7 meq/g.

Powder coatings were prepared by subjecting the ingredients to a high intensity premix, melt-mixing in a twin-screw extruder, pulverizing the extrudate, and sieving the resulting powder through 200 mesh screens. Powders were applied to cold rolled steel panels by electrostatic spray at final film thicknesses of 2.0±0.2 mils. The coatings were cured by baking these panels for 10 minutes at 400° F.

Hot, wet adhesion was evaluated by submersing panels in distilled water at 95° C. for 24 hours. The panels were removed from the water, and briefly cooled to room temperature. A razor blade knife was then used to score a 90° cross on the panel, and the knife was used to try to lift the coating at the intersection of the cross.

Unless stated otherwise, formulation units are given as parts by weight.

Comparative Example 1

Curing Agent D is a 50:50 blend of Catalyst C and dicyandiamide.

| Powder Formulation | |
|---|---|
| Epoxy Resin B | 100 |
| Curing Agent D | 3.8 |
| Wollastonite | 20 |
| Titanium dioxide | 4 |

| Characteristics | |
|---|---|
| Gel time at 400° F.: | 25 sec. |
| Reverse Impact (in-lb): | Pass 160 |
| Direct Impact (in-lb): | Pass 160 |

The coating lifted spontaneously from the panel as soon as it was scribed, and the adhesion did not recover, even after several weeks.

Example 2

Curing Agent E is an 86:14 blend of Curing Agent D and tris(hydroxymethyl) aminomethane

| Powder Formulation | |
|---|---|
| Epoxy Resin B | 100 |
| Curing Agent E | 4.4 |
| Wollastonite | 20 |
| Titanium dioxide | 4 |

| Characteristics | |
|---|---|
| Gel time at 400° F.: | 30 sec. |
| Reverse Impact (in-lb): | Pass 160 |
| Direct Impact (in-lb): | Pass 160 |

The coating did not lift spontaneously from the panel, but initially could be lifted easily using the knife. However, the adhesion recovered after a short period, and the coating could not then be easily lifted from the panel.

Example 3

Curing agent F is an 86:14 blend of Curing Agent D and 2-amino-2-methyl-1,2-propanediol

| Powder Formulation | |
|---|---|
| Epoxy Resin B | 100 |
| Curing Agent F | 8.8 |
| Wollastonite | 40 |
| Titanium dioxide | 8 |

| Characteristics | |
|---|---|
| Gel time at 400° F.: | 29 sec. |
| Reverse Impact (in-lb): | Pass 120 |
| Direct Impact (in-lb): | Pass 120 |

This coating could not be lifted from the panel with the knife after immersions of 24, 48, 72, and 96 hours.

Comparative Example 4

Phenolic Resin G is a phenolic curing agent and is the reaction product of Epoxy Resin A and bisphenol A such that the final product has a phenolic equivalent weight of approximately 250. Curing Agent H is a 98:2 blend of Phenolic Resin G and 2-methyl imidazole.

| Powder Formulation | |
|---|---|
| Epoxy Resin B | 100 |
| Curing Agent H | 25 |
| Wollastonite | 25 |
| Titanium dioxide | 5 |

| Characteristics | |
|---|---|
| Gel time at 400° F.: | 53 sec. |
| Reverse Impact (in-lb): | Pass 160 |
| Direct Impact (in-lb): | Pass 160 |

The coating did not lift spontaneously from the panel, but initially could be lifted easily using the knife. However, the adhesion recovered after a short period, and the coating could not then be easily lifted from the panel.

Example 5

Curing Agent J is a physical blend of Curing Agent G, 2-methyl imidazole and Tris(hydroxymethyl) aminomethane at a ratio of 95.15:2.00:2.85

| Powder Formulation | |
|---|---|
| Epoxy Resin B | 100 |
| Curing Agent J | 25 |
| Wollastonite | 25 |
| Titanium dioxide | 5 |

| Characteristics | |
|---|---|
| Gel time at 400° F.: | 45 sec. |
| Reverse Impact (in-lb): | Pass 160 |
| Direct Impact (in-lb): | Pass 160 |

This coating could not be lifted from the panel with the knife after immersions of 24 hours.

Example 6

Curing Agent K was prepared by heating 372.4 parts of Epoxy Resin A to 127° C. 28.5 parts of tris(hydroxymethyl) aminomethane were then added to the hot resin and allowed to react for 30 minutes. 579.1 parts of bisphenol A were then added, and the mixture was permitted to exotherm to 160° C. This reaction mixture was held for 1 hour. 20.0 parts of 2-methyl imidazole were then added. The product was mixed well, cooled and crushed.

| Powder Formulation | |
|---|---|
| Epoxy Resin B | 100 |
| Curing Agent K | 25 |
| Wollastonite | 25 |
| Titanium dioxide | 5 |

| Characteristics | |
|---|---|
| Gel time at 400° F.: | 61 sec. |
| Reverse Impact (in-lb): | Pass 160 |
| Direct Impact (in-lb): | Pass 160 |

This coating could not be lifted from the panel with the knife after immersions of 24 hours.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A curing composition for an epoxy resin composition comprising a primary amino alcohol physically blended, without the formation of a reaction product, with a curing agent wherein the primary amino alcohol is represented by the formula:

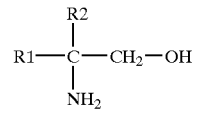

wherein each of R1 and R2 is independently selected from the group consisting of R'O—, R'OO— and HO—CH$_2$— where each R' is hydrogen or a hydrocarbyl group containing 1 to 20 carbon.

2. The curing composition of claim 1 wherein the primary amino alcohol is tris(hydroxymethyl)aminomethane.

3. The curing composition of claim 1 wherein the curing agent is an amine- and/or amide-containing curing agents.

4. The curing composition of claim 3 wherein the primary amino alcohol is present in a range from between about 1 to about 50% by weight of the curing agent.

5. The curing composition of claim 1 wherein the curing agent is a latent curing agent and the epoxy resin composition is a powder coating composition.

6. The curing composition of claim 5 wherein the curing agent is selected from the group consisting of aromatic amines, melamines, substituted melamines, imidazoles, substituted imidazoles, and combinations there of.

7. The curing composition of claim 1 wherein the curing agent is dicyandiamide.

8. The curing composition of claim 1 wherein the curing agent is phenolic compound or a resinous phenolic compound.

9. The curing composition of claim 8 wherein the curing agent is selected from the group consisting of dihydroxy phenols, biphenols, bisphenols, halogenated biphenols, halogenated bisphenols, hydrogenated bisphenols, alkylated biphenols, alkylated bisphenols, trisphenols, phenol-aldehyde resins, phenol-aldehyde novolac resins, halogenated phenol-aldehyde novolac resins, substituted phenol-aldehyde novolac resins, phenol-hydrocarbon resins, substituted phenol-hydrocarbon resins, phenol-hydroxydroxybenzaldehyde resins, alkylated phenol-hydroxybenzaldehyde resins, hydrocarbon-phenol resins, hydrocarbon-halogenated phenol resins, hydrocarbon-alkylated phenol resins, and combinations thereof.

10. The curing composition of claim 8 wherein the curing agent is selected from the group consisting of substituted or unsubstituted phenols, substituted or unsubstituted biphenols, substituted or unsubstituted bisphenols, substituted or unsubstituted novolacs, and combinations thereof.

11. The curing composition of claim 8 wherein the curing agent is a resinous phenolic compound with a phenolic hydroxyl equivalent weight in the range of 200 to 1000.

12. The curing composition of claim 8 wherein the primary amino alcohol is present in a range from between about 0.1 to about 25% by weight of the curing agent.

13. An epoxy resin composition comprising the curing composition of claim 1.

14. The epoxy resin composition of claim 13 wherein the primary amino alcohol is tris(hydroxymethyl)aminomethane.

15. A method for curing an epoxy resin composition comprising contacting the epoxy resin composition wit a curing agent comprising a primary amino alcohol reacted into a resinous phenolic compound wherein the primary amino alcohol is represented by the formula:

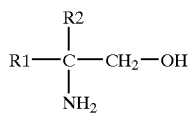

wherein each of R1 and R2 is independently selected from the group consisting of R'O—, R'OO— and HO—CH$_2$— where each R' is hydrogen or a hydrocarbyl group containing 1 to 20 carbon atoms.

16. A curing composition for an epoxy resin composition comprising a primary amino alcohol physically blended, without the formation of a reaction product, with a curing agent, wherein the primary amino alcohol is represented by the formula:

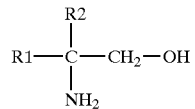

wherein each of R1 and R2 is independently selected from the group consisting of R'S—, R'$_2$N—, R'$_2$P—, and R'$_3$Si— where each R' is hydrogen or a hydrocarbyl group containing 1 to 20 carbon atoms.

17. A curing composition for an epoxy resin composition, wherein the curing composition comprises a primary amino alcohol physically blended, without the formation of a reaction product, with a curing agent, wherein the primary amino alcohol is selected from the group consisting of 2-amino-1-butanol, 2-amino-2-methyl-1,3-propanediol, 2-amino-2-methyl-1-propanol, 2-amino-2-ethyl-1,3-propanediol, 2-amino-3-methyl-1-butanol, 2-amino-1-hexanol, tris(hydroxymethyl)aminomethane and combinations thereof.

18. An epoxy resin composition comprising an epoxy resin and a curing composition, wherein the curing composition comprises a primary amino alcohol physically blended, without the formation of a reaction product, with a curing agent, wherein the primary amino alcohol is selected from the group consisting of 2-amino-1-butanol, 2-amino-2-methyl-1,3-propanediol, 2-amino-2-methyl-1-propanol, 2-amino-2-ethyl-1,3-propanediol, 2-amino-3-methyl-1-butanol, 2-amino-1-hexanol, tris(hydroxymethyl)aminomethane and combinations thereof.

19. The epoxy resin composition of claim 18 wherein the epoxy resin composition is a powder coating composition.

20. The epoxy resin composition of claim 18 wherein the curing agent comprises dicyandiamide.

* * * * *